United States Patent [19]
Takahata et al.

[11] Patent Number: 5,637,815
[45] Date of Patent: Jun. 10, 1997

[54] NOZZLE FOR FLUIDIZED BED MIXING/DISPERSING ARRANGEMENT

[75] Inventors: Shigeru Takahata, Tokyo; Atsushi Eguchi, Ibaraki-ken, both of Japan

[73] Assignee: Shin-Etsu Chemical Co., Ltd., Tokyo, Japan

[21] Appl. No.: 543,450

[22] Filed: Oct. 16, 1995

[30] Foreign Application Priority Data

Oct. 17, 1994 [JP] Japan .................................. 6-276987

[51] Int. Cl.⁶ .................................................. C22C 29/02
[52] U.S. Cl. ............................ 75/236; 75/950; 422/139; 239/86; 239/87; 239/DIG. 19
[58] Field of Search ........................... 422/139, 143; 239/86, 87, 270, DIG. 19; 75/312, 230, 236, 237, 950

[56] References Cited

U.S. PATENT DOCUMENTS

| | | | |
|---|---|---|---|
| 4,359,625 | 11/1982 | Okada et al. | 219/300 |
| 4,429,003 | 1/1984 | Fredriksson et al. | 428/317.9 |
| 5,083,687 | 1/1992 | Saito et al. | 222/591 |
| 5,212,944 | 5/1993 | Martin et al. | 60/253 |
| 5,334,561 | 8/1994 | Matsui et al. | 501/87 |
| 5,407,503 | 4/1995 | Matsui et al. | 156/89 |
| 5,409,165 | 4/1995 | Carroll, III et al. | 239/88 |
| 5,434,112 | 7/1995 | Matsui et al. | 501/87 |

*Primary Examiner*—Christopher Kim
*Attorney, Agent, or Firm*—McAulay Fisher Nissen Goldberg & Kiel, LLP

[57] ABSTRACT

A nozzle is formed of reaction sintered silicon carbide consisting essentially of silicon carbide and unreacted metallic silicon and having a density of 3.03–3.16 g/cm³. The nozzle satisfies the requirements of heat, wear, corrosion and chemical resistance and has experienced no volume shrinkage during sintering. The nozzle is suitable for use in a mixing/dispersing arrangement mounted in a fluidized bed reactor.

6 Claims, 1 Drawing Sheet

NOZZLE FOR FLUIDIZED BED MIXING/ DISPERSING ARRANGEMENT

BACKGROUND OF THE INVENTION

1. Field of the Invention

This invention relates to a nozzle for use in a fluidized bed mixing/dispersing arrangement mounted in a floor of a fluidized bed reactor for uniformly mixing gaseous, liquid and/or powder reactants and catalysts in the reactor.

2. Prior Art

Fluidized bed reactors are conventionally used in the reaction between hydrocarbons, chlorine source gas, oxygen or air and catalyst powder, which is known as oxychlorination reaction. For the oxychlorination reaction, the fluidized bed reactor is provided in the floor of the fluidized bed with a plurality of mixing/dispersing arrangements each having a nozzle built therein. In some applications, nozzles themselves are used as the mixing/dispersing arrangements. These mixing/dispersing arrangements or nozzles are designed such that during operation of the reactor, reactants participating in reaction, including gaseous reactants, liquid reactants, powder catalysts, and powder metals, may be uniformly mixed in the reactor for uniform mutual contact by feeding the reactants into the reactor through the nozzles.

Most of such reactions are exothermic. Since the nozzles for mixing/dispersing arrangements establish a rather unstable mixing state in a reactor, it often happens that abnormal exothermic reaction takes place locally, sometimes reaching a temperature above 500° C. For this reason, the nozzles for mixing/dispersing arrangements are conventionally made of heat resisting alloys such as Incoloy.

The nozzles of heat resisting alloys still undergo severe wear during operation of the reactor and cannot withstand the long-term continuous operation thereof because catalyst particles impinge against the nozzles at high velocity during the reactor operation. When the nozzles for mixing/ dispersing arrangements are seriously damaged, the reaction itself loses stability to create the risk of explosion. It is thus necessary to replace the mixing/dispersing arrangement nozzles at periodic short intervals before the damage reaches the limit.

Even the use of expensive heat resisting alloy cannot fully suppress the damage to the mixing/dispersing arrangement nozzles. Actually, safe operation is ensured by periodic inspection and premature replacement. These are the bar against production efficiency. The expense for the maintenance and inspection at short intervals and the expense for replacement add to the manufacturing cost.

Therefore, wear resistant, chemical resistant and heat resistant nozzles are desirable as the nozzles for mixing/ dispersing arrangements on the floor of a fluidized bed reactor. For example, Japanese Patent Application Kokai (JP-A) No. 180236/1989 discloses that ceramic materials which are obtained by sintering fine powder such as silicon carbide and silicon nitride at high temperature, sometimes at high temperature and high pressure are useful for nozzles for mixing/dispersing arrangements. The mixing/dispersing arrangement nozzles made of these ceramic materials are superior in wear resistance, chemical resistance, corrosion resistance and heat resistance, ensuring stable operation of a fluidized bed reactor for a long time.

Problems arise with these prior art mixing/dispersing arrangement nozzles made of ceramic materials which are obtained by sintering fine powder such as silicon carbide and silicon nitride since sintering of silicon carbide or silicon nitride fine powder is always accompanied by volume shrinkage. In the manufacture of such nozzles of complex configuration requiring dimensional precision, not only a calcined body must be prepared by taking into account the volume shrinkage during sintering, but careful steps must also be taken to prevent deformation during sintering. Even after such a cumbersome process is taken, for nozzles requiring strict dimensional precision, the sintered body must be further machined. Eventually the cost of manufacturing mixing/dispersing arrangement nozzles is increased too much.

It is thus required for the nozzles for mixing/dispersing arrangements on the floor of a fluidized bed reactor that they be not only molded and sintered in a simple manner, but also require as little machining after sintering as possible, to say nothing of the conventional requirements of heat, wear, corrosion and chemical resistance.

SUMMARY OF THE INVENTION

Therefore, an object of the present invention is to provide a nozzle for use in a mixing/dispersing arrangement in a fluidized bed reactor which is formed of a material which is not only resistant to heat, wear, corrosion and chemicals, but also experiences little or no volume shrinkage upon sintering.

The present invention pertains to a nozzle for use in a fluidized bed mixing/dispersing arrangement mounted in a floor of a fluidized bed reactor. We found that a member formed of reaction sintered silicon carbide consisting essentially of silicon carbide and unreacted metallic silicon experiences little volume shrinkage upon sintering as opposed to sintered products of silicon carbide or silicon nitride fine powder. This offers the advantage that a calcined body prior to sintering can be processed to a complex configuration in a simple manner by a machining or similar technique. We have eventually found that if the reaction sintered silicon carbide consisting essentially of silicon carbide and unreacted metallic silicon has a density of 3.03 to 3.16 g/cm$^3$, a nozzle can be easily prepared therefrom. The nozzle is resistant to heat, wear, corrosion and chemicals and thus ensures safe stable operation of a fluidized bed reactor for a long period of time.

Since reaction sintered silicon carbide is generally prepared by calcining silicon carbide and carbon, impregnating the calcined product with metallic silicon, and subjecting it to reaction sintering wherein metallic silicon reacts with the residual carbon as will be described later, the term "unreacted metallic silicon" used in conjunction with the reaction sintered silicon carbide is metallic silicon which is left unreacted after the reaction sintering step.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
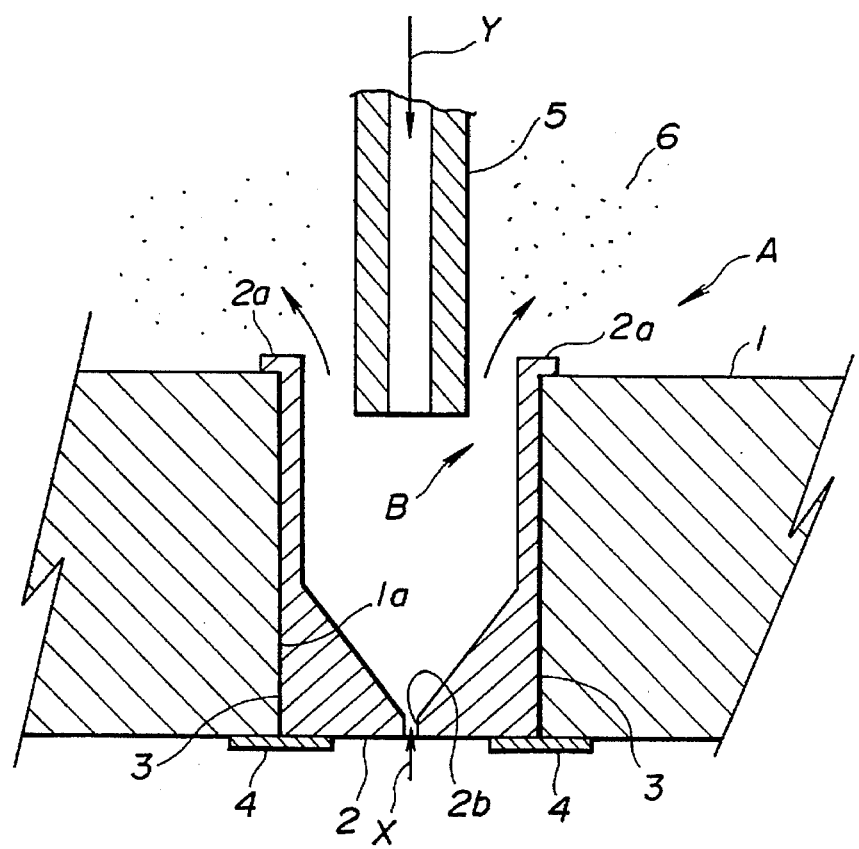
FIG. 1 is a schematic cross-sectional view of a fluidized bed mixing/dispersing arrangement including a nozzle according to one embodiment of the invention.

According to the present invention, reaction sintered silicon carbide consisting essentially of silicon carbide and unreacted metallic silicon is used to form a nozzle for a fluidized bed mixing/dispersing arrangement. The reaction sintered silicon carbide is prepared by a conventional process. First a calcined body containing silicon carbide and carbon as main ingredients is formed. Such a calcined body may be formed by any well-known method, for example, by mixing silicon carbide, carbon and a binder, molding the mixture into a desired shape, and calcining it in an inert atmosphere at a temperature of 600° to 1,000° C. It is recommended to machine the calcined body at this point to the shape and dimensions of a final product because machining after sintering can then be omitted. The calcined body is impregnated with metallic silicon in molten state and then subject to reaction sintering. After the reaction sintering, post-treatment like alkali washing is carried out in a conventional manner, obtaining reaction sintered silicon carbide. The reaction sintered silicon carbide used herein is not particularly limited with respect to its textural structure although reaction sintered silicon carbide in which silicon carbide forms a continuous or matrix phase is preferred as will be demonstrated in Examples later.

Preferably the reaction sintered silicon carbide contains 5.7 to 20.5% by volume, more preferably 8.0 to 15.9% by volume of metallic silicon. Note that the content V (% by volume) of metallic silicon in reaction sintered silicon carbide is determined according to the following equation:

$$V=(3.21-P)/(3.21-2.33)\times 100\%$$

wherein P is the specific gravity (g/cm$^3$) of reaction sintered silicon carbide, silicon carbide has a specific gravity of 3.21 g/cm$^3$, and metallic silicon has a specific gravity of 2.33 g/cm$^3$.

The reaction sintered silicon carbide used herein should have a density of 3.03 to 3.16 g/cm$^3$, preferably 3.07 to 3.14 g/cm$^3$, most preferably 3.08 to 3.13 g/cm$^3$. With a density of less than 3.03 g/cm$^3$, a reaction sintered silicon carbide body can be crumbled on the surface during the post-treatment including alkali treatment with caustic soda after reaction sintering or a reaction sintered silicon carbide body takes a state that silicon carbide is dispersed in less tough metallic silicon and is then brittle and vulnerable to wear and chemicals. On the other hand, with a density in excess of 3.16 g/cm$^3$, a more portion left unreacted after reaction sintering and failure promoted by cracking make it very difficult to provide acceptable nozzles and if possible, the nozzle manufacture is inconsistent due to the residual internal stresses.

The reaction sintered silicon carbide having a density of 3.03 to 3.16 g/cm$^3$ may be prepared by any desired method as long as the desired density is achievable. Preferably, silicon carbide, graphite powder, and a binder are blended such that the mixture consists of 40 to 70 parts by weight of silicon carbide, 15 to 35 parts by weight of graphite powder and 15 to 25 parts by weight of a binder per 100 parts by weight of the mixture. Even when these three components are blended in amounts outside the above-defined range, the objects of the present invention can still be attained if the type and particle size distribution of the components used and molding technique are appropriately selected.

Where the nozzle for a fluidized bed mixing/dispersing arrangement according to the present invention is used in an atmosphere causing corrosion of metallic silicon, metallic silicon near the surface of the nozzle can fall off through reaction with the atmosphere, detracting from the physical properties of the nozzle, especially wear resistance. To avoid such inconvenience, especially when severer requirements of corrosion resistance and chemical resistance are imposed on the nozzle for a fluidized bed mixing/dispersing arrangement, the nozzle of the invention is further covered on the surface with a silicon carbide coating. This improves the safe operation of the nozzle. The silicon carbide coating preferably has a thickness of about 30 to 1,000 µm, more preferably about 50 to 200 µm. Coatings of less than 30 µm thick are less resistant to wear whereas coatings of more than 1,000 µm thick contribute to no further improvements and are rather uneconomical. Any desired method may be used to coat the nozzle with silicon carbide although chemical vapor deposition (CVD) is advantageous.

Referring to FIG. 1, there is schematically illustrated a nozzle for use in a fluidized bed mixing/dispersing arrangement as being mounted in a floor of a fluidized bed reactor. A fluidized bed reactor (not shown, but its interior is generally depicted at A) has a floor 1 and contains catalyst powder 6. A fluidized bed mixing/dispersing arrangement generally depicted at B includes a nozzle 2. The floor 1 is of metal and perforated with a through-hole 1a, in which the nozzle 2 is fitted. The nozzle 2 includes a cylindrical sleeve with an outer diameter of 70 mm and a height of 100 mm, for example, having an open upper end and a closed lower end. The sleeve 2 is provided at the upper end with an annular flange 2a having an outer diameter of 80 mm. When the sleeve 2 is inserted into the hole 1a in the floor, the flange 2a abuts against the upper edge of the hole 1a. The sleeve 2 is bonded to the wall of the hole 1a with an inorganic adhesive 3. A fixture 4 is secured to the lower surfaces of the floor 1 and sleeve 2. The nozzle 2 is fixedly secured in the hole 1a in this way. The nozzle 2 further has an orifice or port 2b at the center of the low end. The orifice 2b has an inner diameter of 2 mm, for example. Therefore, the nozzle bore includes the orifice 2b, a divergent section and a cylindrical section extending to the upper end as seen from FIG. 1. A tube 5 of heat resisting alloy is disposed above the nozzle 2 and in the reactor interior A. The tube 5 is held such that the lower or tip end thereof is positioned within the nozzle 2 near its upper end. Preferably the tube 5 is aligned with the nozzle 2. The nozzle 2 cooperates with the tube 5 to construct the mixing/dispersing arrangement B.

The mixing/dispersing arrangement B operates as follows. A reactant gas is introduced into the nozzle 2 through the orifice 2b as shown by arrow X, passed through the nozzle bore, and injected into the interior A of the fluidized bed reactor above the floor 1 at a high velocity. Where two reactant gases are used, one gas is introduced into the nozzle 2 from above through the tube 5 as shown by arrow Y and the other gas is introduced into the nozzle 2 from below through the orifice 2b as shown by arrow X as mentioned just above. The two gases are uniformly mixed and dispersed within the nozzle bore and then injected into the fluidized bed reactor interior A at a high velocity. The gas(es) thus injected contacts and fluidizes the powder catalyst 6 in the reactor whereupon reaction takes place.

Figure 2:
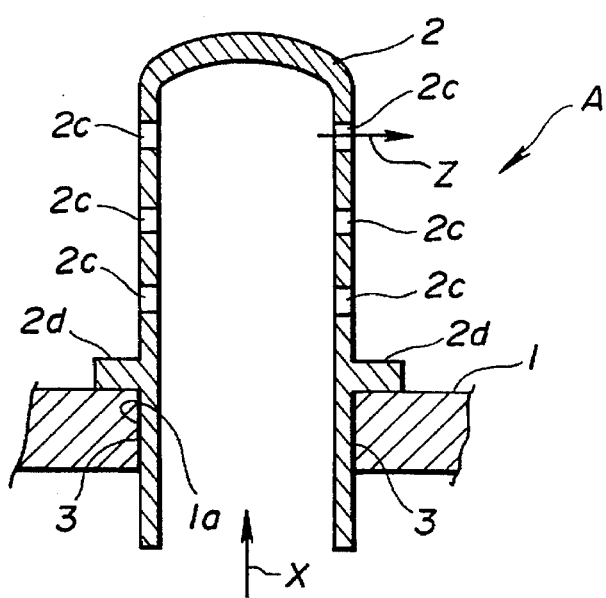
FIG. 2 is a schematic cross-sectional view of a fluidized bed mixing/dispersing nozzle according to another embodiment of the invention.

Another embodiment of the nozzle for a fluidized bed mixing/dispersing arrangement is shown in FIG. 2. The nozzle 2 is a cylindrical nozzle made of reaction sintered silicon carbide having a closed upper end and an open lower end. The nozzle 2 is perforated on its upper side wall with a plurality of passages or holes 2c and provided at a middle with an annular flange 2d. The nozzle 2 is vertically fitted in the hole 1a in the floor 1 with the flange 2d resting on the floor 1 so that the upper perforated portion of the nozzle 2 protrudes into the reactor interior A. In this embodiment, the nozzle alone constructs a fluidized bed mixing/dispersing arrangement. On use, a reactant gas is introduced from below into the nozzle 2 as shown by arrow X, passed through the holes 2c, and injected into the interior A of the fluidized bed reactor above the floor 1 at a high velocity as shown by arrow Z.

It is understood that the nozzle for a fluidized bed mixing/dispersing arrangement according to the present invention is not limited to the illustrated embodiments.

Using the nozzle for a fluidized bed mixing/dispersing arrangement according to the invention, various chemical reactions can be carried out, for example, synthesis of chlorides through oxychlorination, synthesis of acrylonitrile through ammoxydation of propylene, synthesis of phthalic anhydride from o-xylene or benzene, and catalytic cracking of hydrocarbons.

EXAMPLE

Examples of the present invention are given below by way of illustration and not by way of limitation.

Experiment 1

A granular mixture was obtained by blending silicon carbide powder GC #1500 (by Sinano Smelting K.K., mean particle size 8 μm), graphite powder CSSP-b (by Nippon Graphite K.K.), and silicone varnish binder KR-260 (Shin-Etsu Chemical Co., Ltd.) in the amounts (parts by weight) shown in Table 1, adding toluene to the blend, milling it in a ball mill for 4 hours, and removing toluene.

Using a die press, each mixture was compacted under a pressure of 1.6 t/cm$^2$ to form a compact of 70 mm ×50 mm ×10 mm. The compact was heated to 800° C. in a nitrogen atmosphere at a rate of 50° C./hour, maintained at the temperature for 4 hours, and then cooled down to room temperature, obtaining a calcined compact. The calcined compact was impregnated with molten metallic silicon and subject to reaction sintering, obtaining a reaction sintered silicon carbide body. Sample Nos. 1 to 6 were obtained in this way. Each sample was sectioned into 20 specimens sized 3 mm ×4 mm ×40 mm, which were measured for density and flexural strength according to JIS R-1601-1981. An average of measurements is reported for each sample in Table 1.

In sample Nos. 5 and 6, the compacts cracked after they were impregnated with molten metallic silicon and specimens could not be cut therefrom. Therefore, measurement of specimens was impossible. In sample No. 4, the surface of its specimens was observed under a microscope to find some portions regarded unreacted.

TABLE 1

| Sample | Mixture, parts by weight | | | Density (g/cm$^3$) | Flexural strength (kgf/mm$^2$) |
|---|---|---|---|---|---|
| | SiC powder | Graphite powder | Silicone varnish* | | |
| 1 | 70 | 10 | 20 | 2.90 | 43.1 |
| 2 | 60 | 20 | 20 | 3.06 | 43.3 |
| 3 | 53 | 27 | 20 | 3.05 | 45.9 |
| 4 | 50 | 30 | 20 | 3.13 | 24.8 |
| 5 | 40 | 40 | 20 | — | — |
| 6 | 30 | 50 | 20 | — | — |

*as solids

Experiment 2

Sample Nos. 1 to 4 were obtained by the same procedure as in Experiment 1. The samples were subject to alkali treatment with caustic soda (10% NaOH solution) at 80° C. for 24 hours to remove the metallic silicon depositing on the surface. Thereafter, each sample was examined for appearance. Sample No. 1 had a crumbly surface. The remaining sample Nos. 2 to 4 had a sound surface where no cracks or defects were found.

Examples 1–3

A granular mixture was obtained by the same blending and milling procedure as in Sample No. 3 of Experiment 1. Using a hydrostatic press and a funnel-shaped mold having an outer diameter of 60 mm, the mixture was compacted into a cylindrical compact having an outer diameter of 80 mm and a height of 100 mm under the condition shown in Table 2. Five compacts were obtained from each lot. The compacts were calcined as described for sample No. 3 of Experiment 1. Using a lathe, each calcined compact was machined to the same shape as shown in FIG. 1. It was then impregnated with molten metallic silicon and subject to reaction sintering, obtaining a reaction sintered silicon carbide body. It was subject to alkali treatment with caustic soda (10% NaOH solution) at 80° C. to remove the metallic silicon depositing on the inside and outside surfaces. In this way, final products of Examples 1 to 3 were obtained as nozzles for a fluidized bed mixing/dispersing arrangement.

The resulting nozzles were examined for appearance. The results are shown below.

The nozzles of Example 1 had a good appearance and a somewhat rugged surface. The nozzle was broken, and the fractured surface was observed under an electron microscope (SEM), indicating that silicon carbide was dispersed in metallic silicon.

The nozzles of Example 2 had a very good appearance.

The nozzles of Example 3 had a somewhat inferior appearance. Cracks were found in one of the nozzles. This cracked nozzle was broken, and those portions where cracks occurred were measured for density. Some portions had a density of 3.153 g/cm$^3$.

Next, five nozzles of each Example were measured for specific gravity (density) by a submerging method and an average value was determined. Also the content (vol%) of metallic silicon in reaction sintered silicon carbide was calculated therefrom according to the calculation equation mentioned previously.

Four mixing/dispersing nozzles 2 of each Example were mounted in holes 1a in a floor 1 of a fluidized bed reactor as shown in FIG. 1. Using ethylene, hydrogen chloride, and oxygen (or air) as reactants, oxychlorination of ethylene was carried out for 16,000 hours in the reactor having the four nozzles mounted in the floor. The reactor was loaded with copper chloride on alumina as a fluidized bed catalyst. At the end of operation, the orifices 2b of the nozzles 2 were measured for diameter to determine a diameter change which was expressed by a maximum diameter reduction.

The results are shown in Table 2.

TABLE 2

| Example | Hydrostatic pressure (t/cm$^2$) | Appearance | Specific gravity (g/cm$^3$) | Metallic silicon content (vol %) | Orifice diameter change (mm) |
|---|---|---|---|---|---|
| 1 | 0.8 | good | 3.05 | 18.2 | 0.4 |
| 2 | 1.2 | very good | 3.11 | 11.4 | ≦0.02 |
| 3 | 1.6 | somewhat inferior | 3.14 | 8.0 | ≦0.02 |

There has been described a nozzle which is formed of reaction sintered silicon carbide consisting essentially of silicon carbide and unreacted metallic silicon and having a density of 3.03 to 3.16 g/cm$^3$. The nozzle can be easily fabricated to desired dimensions with precision. The nozzle satisfies the requirements of heat, wear, corrosion and chemical resistance. The nozzle is thus suitable for use in a fluidized bed mixing/dispersing arrangement which is mounted in a fluidized bed reactor adapted to carry out reaction using a fluidized bed of catalyst.

Although some preferred embodiments have been described, many modifications and variations may be made thereto in the light of the above teachings. It is therefore to be understood that within the scope of the appended claims, the invention may be practiced otherwise than as specifically described.

We claim:

1. A nozzle for use in a fluidized bed mixing/dispersing arrangement mounted in floor of a fluidized bed reactor, said nozzle being formed of reaction sintered silicon carbide consisting essentially of silicon carbide and unreacted metallic silicon and having a density of 3.07 to 3.14 g/cm$^3$, said reaction sintered silicon carbide containing 8.0 to 15.9% by volume of metallic silicon.

2. The nozzle of claim 1 which is covered with a silicon carbide coating.

3. The nozzle of claim 1 wherein said reaction sintered silicon carbide has a density of 3.08 to 3.13 g/cm$^3$.

4. A nozzle for use in a fluidized bed mixing/dispersing arrangement mounted in floor of a fluidized bed reactor, said nozzle being formed of reaction sintered silicon carbide consisting essentially of silicon carbide and unreacted metallic silicon and having a density of 3.07 to 3.14 g/cm$^3$, said reaction sintered silicon carbide containing 8.0 to 15.9% by volume of metallic silicon wherein said reaction sintered silicon carbide is prepared by mixing silicon carbide, graphite powder and a binder so that the mixture consist of 40 to 70 parts by weight of silicon carbide, 15 to 35 parts by weight of graphite powder and 15 to 25 parts by weight of the binder per 100 parts by weight of the mixture, press molding the mixture into a desired shape, calcining the press molded body in an inert atmosphere at a temperature of 600° to 1000° C., impregnating the calcined body with metallic silicon in molten state, and reaction sintering the metallic silicon impregnated calcined body.

5. The nozzle of claim 4 which is covered with a silicon carbide coating.

6. The nozzle of claim 4 wherein said reaction sintered silicon carbide has a density of 3.08 to 3.13 g/cm$^3$.

* * * * *